United States Patent Office 2,963,195
Patented Dec. 6, 1960

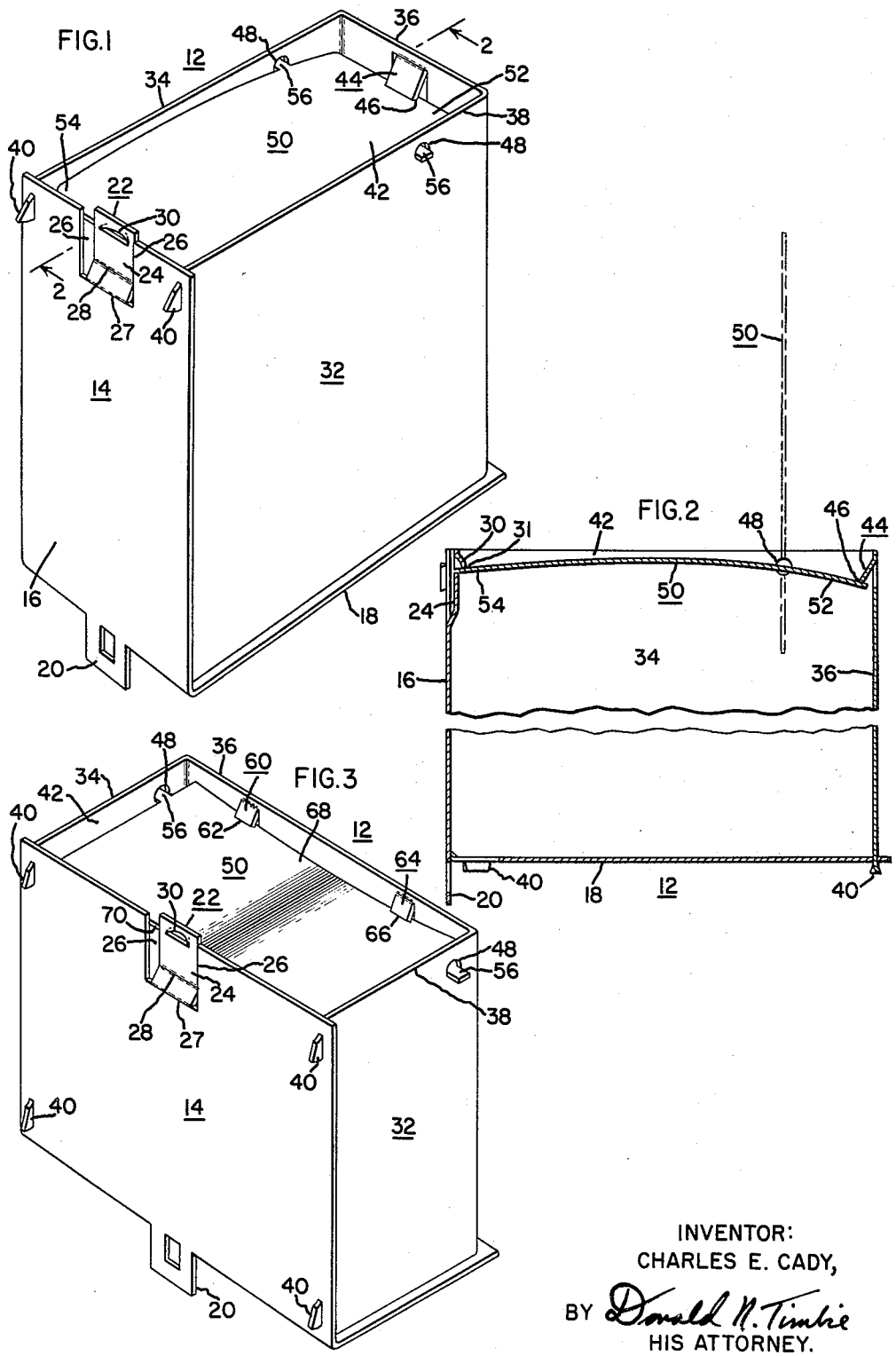

2,963,195
SNAP-OPENING BOX

Charles E. Cady, North Syracuse, N.Y., assignor to General Electric Company, a corporation of New York Filed May 1, 1957, Ser. No. 656,394

3 Claims. (Cl. 220—35)

The present invention relates to an improved box having a snap-opening cover.

In every television receiver the high voltage components are placed in a metal box as a safeguard against shocks and fires. Each of these metal boxes usually comprises a main body that forms five of the six sides of the box. The sixth side is formed by a cover that can be opened to obtain entry into the box.

In the past this cover has been attached to the box by added hardware such as hinges and/or screws. This added hardware is an expensive item in the mass production of television sets wherein large numbers of these boxes are used. Consequently, it would be advantageous to have a box upon which the cover could be secured without such hardware.

Accordingly, an object of the present invention is to provide a box in which the cover is secured by means integral with the box.

Another disadvantage of prior boxes is that they can be opened only through the use of tools such as screwdrivers.

Thus, another object is to provide a box that can be opened with one's fingers.

It would be desirable to have a box in which the cover pops out. Then there would be no need for prying or forcing the cover open as there is in conventional boxes.

Therefore, a further object of the present invention is to provide a box with a pop-open cover.

Briefly, one way of achieving these objectives in accordance with the principles of this invention is by providing a flexible cover for the opening in a box. This cover can hinge to the box by means of extensions on opposite sides of the cover that engage holes located adjacent the opening. A stop tab is formed from one of the walls of the box so as to be approximately equidistant from the holes and to extend into the box in a direction that is away from the opening. This stop tab provides a stop for one end of the cover. A catch tab having a lip for engaging the cover is formed from the wall opposite from the stop tab. The position of this catch tab is such that the cover must be slightly bent to engage the lip. Due to its bent position, the cover springs to a straight position when it is released by a lifting of the catch tab and thereby gains momentum that carries it to an open position.

The features of my invention that I believe to be novel are set forth with particularity in the appended claims. My invention itself, however, both as to its organization and method of operation, together with further objects and advantages thereof, may best be understood by reference to the following description taken in connection with the accompanying drawing in which:

Fig. 1 is an isometric view of one embodiment of my invention,

Fig. 2 is a cross-sectional view taken along the line 2—2 of Fig. 1, and

Fig. 3 is an isometric view of another embodiment of my invention.

In Fig. 1, there is shown a box 12 having an L-shaped mounting plate 14 that forms sides 16 and 18. This plate is called a mounting plate because it has a mounting member 20 by which box 12 can be mounted to a television set or to whatever it is desired that this box should be mounted to. A catch means 22, shown to be a tab, is formed from side 16 near an edge thereof. This means has a body portion 24 that is preferably separated from side 16 by gaps 26, the presence of which eliminates the possibility of binding between body portion 24 and side 16. This body portion is bent into box 12 along one line 27 and is bent substantially parallel with the box along another line 28. On the box side of body portion 24, a raised lip 30 is formed with a catch edge 31 (shown in Fig. 2) at one end thereof. This lip gradually increases in height along its length towards catch edge 31 so as to provide an inclined plane surface. For reasons that will be subsequently explained, catch means 22 should be resilient.

A U-shaped wrap 32 forming sides 34, 36, and 38 can be joined to plate 14 by any suitable means. The means shown comprises twisted tabs 40 extending through slits (not numbered) in plate 14. Wrap 32 and plate 14 cooperate to form an opening 42 by which access can be had to the interior of box 12. Side 36 of wrap 32 has a stop means 44, here shown to be a tab, formed from it adjacent opening 42. This stop means extends into box 12 to present a stop edge 46 for limiting movement from the interior of box 12 towards the opening 42. Sides 34 and 38 each have a hole 48 located adjacent opening 42 and preferably nearer side 36 than side 16. These holes which are similarly located are positioned such that the plane defined by these holes and the stop edge 46 is situated from catch edge 31 in a direction away from the interior of box 12. In other words, if the direction from a point within box 12 towards opening 42 is considered to be the forward direction, then this plane is forward of catch edge 31.

A cover 50 having ends 52 and 54, is slightly smaller than opening 42 and is mounted in this opening by means of extensions 56 that engage holes 48. Cover 50 is constructed of a flexible material such as sheet metal so that when end 52 is held by stop edge 46, the cover can be bent to permit end 54 to be secured by catch edge 31.

In the cross-sectional view of Fig. 2 there is a better showing of the bend in cover 50 produced by the cooperation of catch edge 31, stop edge 46, and extensions 56 in holes 48. The dotted line showing of cover 50 illustrates the ready access to the interior of box 12 that can be had when cover 50 is released from catch means 22.

For an understanding of the operation of cover 50, assume that it is initially in the dotted line position shown in Fig. 2. As cover 50 is closed, end 52 engages stop edge 46 and is held thereby. It should be apparent that after end 52 is engaged, cover 50 must be bent to provide further movement of end 54. As this cover is bent and end 54 moved, this end engages the inclined plane surface and forces catch means 22 towards side 16. Because this catch means is resilient this forcing does not deform it but rather stores potential energy in it in the form of a spring action. When end 54 is slid past catch edge 31, the spring action of catch means 22 forces it away from side 16 and towards end 54. Catch edge 31 then engages end 54 thereby preventing movement of end 54 towards opening 42. Cover 50 is thus locked.

To unlock cover 50, catch means 22 is bent away from end 54 until this end is no longer secured by catch edge 31. Then the spring action that has been stored in cover 50 by its bending, causes it to spring away from its locked position and to move towards opening 42. The momentum stored in the cover by this spring movement causes it to move to a position approximately the same as that shown by the dotted lines in Fig. 2. With cover 50 in this position, ready access can be had to the interior of box 12.

In my embodiment of Figs. 1 and 2, cover 50 is hinged by means of extensions 56 located along the longer edges of the cover. In some boxes it may be desirable to have these extensions located along the shorter edges. A box embodying this latter feature is shown in Fig. 3.

In Fig. 3, except for the stop means 44 and the ends of cover 50, the elements of box 12 are the same as in my embodiment of Figs. 1 and 2. These common elements have the same reference numerals. The different structure in Fig. 3 includes a first stop means 60 with a stop edge 62 and a second stop means 64 with a stop edge 66. Cover 50 has an end 68 that engages stop edges 62 and 66 and an end 70 that engages catch edge 31.

The operation of cover 50 in Fig. 3 is similar to the operation of this cover in my first embodiment. The only differences are that two stop edges engage cover 50 rather than one and the cover 50 bends in the middle away from opening 42 towards the interior of box 12 rather than towards opening 42. The reason that cover 50 bends inward is because it has more tendency to bend along its longer dimension than its shorter, as is characteristic of flexible materials. It should be apparent that the only way for cover 50 to bend along its longer dimension and at the same time for end 70 to engage catch edge 31 is for cover 50 to bow inward along its longer dimension. Of course when cover 50 is released by a lifting of catch means 22, it springs from the bowed shape to its normal shape. In so doing, the cover gains a momentum that carries it to an open position.

In the foregoing discussion, a particular box 12 was shown and described. This was done merely for illustrative purposes. Actually, the present invention can be practiced with a box of nearly any shape that is constructed in nearly any manner. However, the box and cover are preferably made of metal because many metals are resilient and inexpensive and because tabs can be readily formed from many types of metals. But the box need not be made of metal. It could be made of any material providing catch means 22 and cover 50 are resilient.

Although the invention has been described by reference to a particular embodiment thereof, it will be understood that numerous modifications can be made by those skilled in the art without departing from the invention, I therefore, aim in the appended claims to cover all such equivalent variations as come within the true spirit and scope of my invention.

What I claim as new and desire to secure by Letters Patent of the United States is:

1. A snap-opening box comprising a main body having an opening at one end thereof and two holes therein positioned on opposite sides of said main body near said opening, a flexible cover of slightly smaller dimensions than said opening having extensions thereon, said flexible cover being positioned in said main body by mounting said extensions thereon in said holes for pivotal movement therein, stop means near and extending into said opening on a side other than the opposite sides containing said holes, said stop means bearing on the surface of said flexible cover when the cover is pivoted down into said opening, resilient catch means on said main body near and extending into said opening on a side opposite said stop means, said catch means having a raised lip thereon for engaging said flexible cover when it is pivoted into said opening to thereby deform said flexible cover which is held at the other end thereof by said stop means, the deformed flexible cover thereby providing a snap-open action when said catch means is released.

2. A snap-opening box comprising a main body having first, second, third, and fourth walls that form a rectangular opening, wherein said first wall is opposite said third wall, said first and third walls each having a similarly-located hole therein positioned near said opening, a first stop tab formed from said second wall so as to extend into said box and away from said opening, a catch tab formed from said fourth wall so as to extend into said box and toward said opening, a lip formed on said catch tab to extend into said box and presenting a surface that gradually increases in height in a direction into said box and away from said opening, a flexible cover of slightly smaller size than said opening having extensions thereon on two opposite edges of said cover for engaging said holes and pivotally mounting said cover therein, said flexible cover being deformed when pivoted into said opening by the combined action of said stop tab bearing on flexible cover while said lip engages said cover to hold said cover in deformed position thereby providing a snap-open action when said catch tab is released.

3. A snap-opening box comprising a main body having an opening therein, the sides of said main body being formed by an L-shaped member and a U-shaped member which are interconnected such that the opening therein is formed by the legs and base of said U-shaped member and one of the legs of said L-shaped member, a deformable tab on said L-shaped member extending into said opening, a lip on said tab extending outward and down into said opening, a stop means on the base of said U-shaped member consisting of a tab extending outward from the base of said U-shaped member and downward into said opening, a hole on each of the legs of said U-shaped member positioned near said opening and the base of said U-shaped member, a flexible cover of slightly smaller dimensions than said opening having extensions thereon engaging said holes for pivotal movement therein to position said cover in said opening, said flexible cover being deformed when pivoted into said opening in engagement under the lip on said tab on one end thereof and held in place by the tab of said stop means on the other end thereof thereby allowing said flexible cover to snap-open when said deformable tab is released.

References Cited in the file of this patent

UNITED STATES PATENTS

| 323,027 | Ducker | July 28, 1885 |
| 1,976,720 | Engels | Oct. 16, 1934 |
| 2,105,964 | Boh | Jan. 18, 1938 |
| 2,657,822 | Simpson | Nov. 3, 1953 |
| 2,661,139 | Brooks | Dec. 1, 1953 |

FOREIGN PATENTS

| 857,600 | Germany | Oct. 2, 1952 |
| 1,090,951 | France | Oct. 27, 1954 |